United States Patent
Hage

(10) Patent No.: US 11,588,918 B2
(45) Date of Patent: Feb. 21, 2023

(54) METHODS AND APPARATUS TO SUPPLEMENT WEB CRAWLING WITH CACHED DATA FROM DISTRIBUTED DEVICES

(71) Applicant: The Nielsen Company (US), LLC, New York, NY (US)

(72) Inventor: Chad Hage, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/556,185

(22) Filed: Aug. 29, 2019

(65) Prior Publication Data
US 2019/0394294 A1    Dec. 26, 2019

Related U.S. Application Data

(63) Continuation of application No. 15/167,106, filed on May 27, 2016, now Pat. No. 10,404,818, which is a
(Continued)

(51) Int. Cl.
*G06F 16/00* (2019.01)
*H04L 67/568* (2022.01)
(Continued)

(52) U.S. Cl.
CPC .......... *H04L 67/568* (2022.05); *G06F 16/951* (2019.01); *G06F 16/9574* (2019.01); *H04L 43/0876* (2013.01); *H04L 67/535* (2022.05)

(58) Field of Classification Search
CPC .............. G06F 16/951; G06F 21/6227; G06F 16/2455; G06F 21/31; G06F 16/9535; G06F 16/2228; G06F 16/248; G06F 16/93; G06F 40/58; G06F 9/454; G06F 21/6218; G06F 16/9574; G06F 40/263; G06F 11/3664; G06F 11/3668; G06F 21/36; G06F 21/46; G06F 21/577; G06F 2221/2133; G06F 11/3414; G06F 11/3495; G06F 16/2452; G06F 16/9577; G06F 2201/875;
(Continued)

(56) References Cited

U.S. PATENT DOCUMENTS 6,381,567 B1 * 4/2002 Christensen ............ G06F 9/454
   704/8
7,016,977 B1 * 3/2006 Dunsmoir ............. G06F 16/958
   709/246
(Continued)

OTHER PUBLICATIONS

United States Patent and Trademark Office, "Final Office Action," issued in connection with U.S. Appl. No. 13/837,510, dated Sep. 25, 2015, 9 pages.
(Continued)

*Primary Examiner* — Yicun Wu
(74) *Attorney, Agent, or Firm* — Hanley, Flight & Zimmerman, LLC

(57) ABSTRACT

Methods and apparatus to supplement web crawling with cached data from distributed devices are disclosed. An example apparatus includes a browser monitor to extract a language setting from a web browser of a panelist computing device, and a data communicator to transmit data associated with a webpage accessed by the web browser and an indication of the language setting to a server.

25 Claims, 13 Drawing Sheets

Related U.S. Application Data continuation of application No. 13/837,510, filed on Mar. 15, 2013, now Pat. No. 9,355,176.

(51) Int. Cl.
*G06F 16/951* (2019.01)
*G06F 16/957* (2019.01)
*H04L 67/50* (2022.01)
*H04L 43/0876* (2022.01)

(58) Field of Classification Search
CPC ............. G06F 2221/2141; G06F 16/00; G06F 16/316; G06F 3/04842; G06F 40/126; G06F 40/221; G06F 40/232; G06F 40/242; G06F 40/47; G06F 9/00; G06F 16/337; G06F 16/68; G06F 16/78; G06F 16/90335; G06F 16/95; G06F 16/9558; G06F 21/41; G06F 21/53; G06F 21/6236; G06F 2201/87; G06F 2201/88; G06F 2221/2115; G06F 2221/2117; G06F 2221/2119; G06F 40/129; G06F 40/14; G06F 40/211; G06F 40/40; G06F 11/3419; G06F 11/3438; G06F 16/20; G06F 16/24578; G06F 16/3322; G06F 16/3332; G06F 16/9537; G06F 16/9566; G06F 16/958; G06F 21/10; G06F 21/6263; G06F 3/0481; G06F 3/04817; G06F 3/0482

See application file for complete search history.

(56) References Cited

U.S. PATENT DOCUMENTS

| | | | |
|---|---|---|---|
| 7,436,321 B2 | 10/2008 | White, II et al. | |
| 7,587,732 B2 | 9/2009 | Wright et al. | |
| 7,702,317 B2 | 4/2010 | Montelius | |
| 7,769,149 B2 | 8/2010 | Berkman | |
| 7,792,948 B2* | 9/2010 | Zhao | H04L 41/06 709/224 |
| 8,032,125 B2 | 10/2011 | Wisebourt et al. | |
| 8,688,771 B2 | 4/2014 | East et al. | |
| 8,903,946 B1 | 12/2014 | Roskind | |
| 9,355,176 B2 | 5/2016 | Hage | |
| 9,646,104 B1 | 5/2017 | Canavor et al. | |
| 2002/0078136 A1 | 6/2002 | Brodsky et al. | |
| 2005/0125412 A1 | 6/2005 | Glover | |
| 2012/0271805 A1 | 10/2012 | Holenstein et al. | |
| 2012/0316860 A1* | 12/2012 | Reitan | G06F 40/58 704/2 |
| 2013/0198125 A1 | 8/2013 | Oliver et al. | |
| 2013/0226896 A1 | 8/2013 | Chin et al. | |
| 2013/0227078 A1 | 8/2013 | Wei et al. | |
| 2013/0246609 A1 | 9/2013 | Topchy et al. | |
| 2014/0280009 A1 | 9/2014 | Hage | |
| 2016/0277523 A1 | 9/2016 | Hage | |

OTHER PUBLICATIONS

United States Patent and Trademark Office, "Non-Final Office Action," issued in connection with U.S. Appl. No. 13/837,510, dated Mar. 26, 2015, 10 pages.

United States Patent and Trademark Office, "Notice of Allowance," issued in connection with U.S. Appl. No. 13/837,510, dated Jan. 20, 2016, 8 pages.

United States Patent and Trademark Office, "Notice of Allowance", issued in connection with U.S. Appl. No. 15/167,106, dated Apr. 4, 2019, 8 pages.

United States Patent and Trademark Office, "Non-Final Office Action", issued in connection with U.S. Appl. No. 15/167,106, dated Sep. 20, 2018, 8 pages.

* cited by examiner

| | 802 | 804 | 806 | 808 | 810 |
|---|---|---|---|---|---|
| | Website | Geography | Browser | Language | Source |
| | cnn.com | NYC | Firefox | English | Panelist 1 |
| | cnn.com | NYC | Firefox | French | Cralwer |
| | cnn.com | NYC | IE | English | Crawler |
| | cnn.com | NYC | IE | French | Panelist 2 |
| | cnn.com | Chicago | Firefox | English | Crawler |
| | cnn.com | Chicago | Firefox | French | Panelist 4 |
| | cnn.com | Chicago | IE | English | Panelist 3 |
| | cnn.com | Chicago | IE | French | Crawler |
| | amazon.com | NYC | Firefox | English | Panelist 1 |
| | amazon.com | NYC | Firefox | French | Crawler |
| | amazon.com | NYC | IE | English | Panelist 5 |
| | amazon.com | NYC | IE | French | Crawler |
| | amazon.com | Chicago | Firefox | English | Crawler |
| | amazon.com | Chicago | Firefox | French | Panelist 4 |
| | amazon.com | Chicago | IE | English | Crawler |
| | amazon.com | Chicago | IE | French | Panelist 2 |

FIG. 8

METHODS AND APPARATUS TO SUPPLEMENT WEB CRAWLING WITH CACHED DATA FROM DISTRIBUTED DEVICES

CROSS REFERENCE TO RELATED APPLICATIONS

This patent arises from a continuation of U.S. patent application Ser. No. 15/167,106, (Now U.S. Pat. No. 10,404,818), which was filed on May 27, 2016, which arises from a continuation of U.S. patent application Ser. No. 13/837,510, (Now U.S. Pat. No. 9,355,176), which was filed on Mar. 15, 2013. U.S. patent application Ser. No. 15/167,106 and U.S. patent application Ser. No. 13/837,510 are hereby incorporated herein by reference in their entireties. Priority to U.S. patent application Ser. No. 15/167,106 and U.S. patent application Ser. No. 13/837,510 are hereby claimed.

FIELD OF THE DISCLOSURE

This disclosure relates generally to internet indexing, and, more particularly, to methods and apparatus to supplement web crawling with cached data from distributed devices

BACKGROUND

As the internet has increased in popularity, indexing the internet has become increasingly more important. One method of indexing the internet is through the use of a web crawler. A web crawler is a 'bot' or software application that visits websites and indexes or records the contents of the websites visited.

BRIEF DESCRIPTION OF THE DRAWINGS

FIG. 8 is an example table 800 that may be generated by the example crawler 115 of FIGS. 1 and 2.

DETAILED DESCRIPTION

Figure 1:
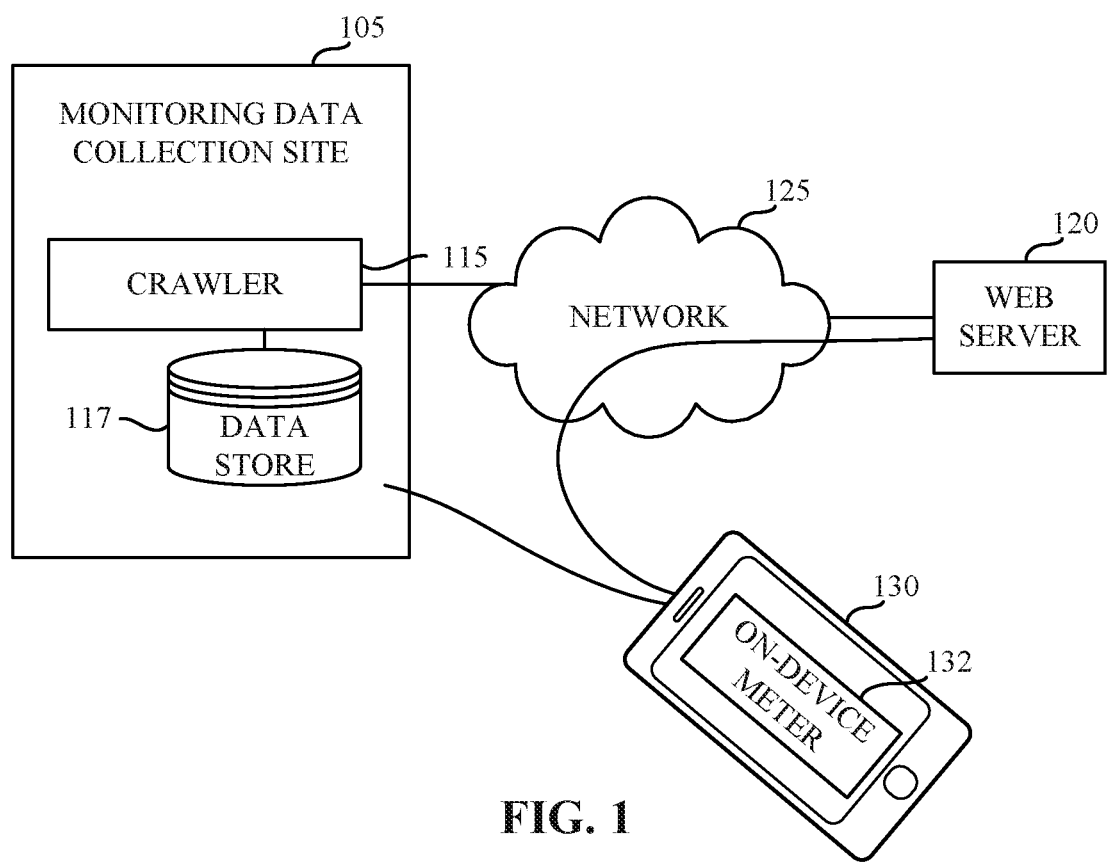
FIG. 1 is a block diagram of an example internet indexing system constructed in accordance with the teachings of this disclosure.

Indexing of the internet is often accomplished using a web crawler. A web crawler is a computing device and/or a software application on the computing device that automatically visits websites (e.g., websites from a list, websites determined from an algorithm, etc.) and indexes or records the contents of the visited websites. This methodology allows the web crawler to maintain an index of the internet.

Because websites on the internet are constantly being updated and changed, a web crawler must continually visit a website in order to maintain an accurate index of its content. Furthermore, many websites customize their content for particular web browsers and/or geographic locations (e.g., the content is tailored to the geographic location from where an internet user is located when viewing a website by, for example, language, local interest, local stores, local marketplace offerings, local news, etc.). In order to index all of the possible variations of a website, a web crawler must visit the website numerous times using different browsers or from different locations.

All of the above factors cause a web crawler to use a significant amount of resources making the numerous visits to websites required to maintain an accurate index of the internet. Furthermore, if a web crawler makes too many visits to a website, the available bandwidth for other internet users to view the website may be reduced. This may result in the operator of the website blocking the web crawler from accessing the website.

Examples disclosed herein provide methods and apparatus to supplement index data collected by a web crawler with content from the internet browser cache(s) of internet user(s). Examples herein leverage the presence of a panel of individuals who volunteer to have their media usage activity (e.g., internet history) monitored to supplement and/or replace web crawler activity. In examples disclosed herein, the internet browser cache(s) of the computing devices associated with panelists includes the contents of websites recently viewed by the browser(s) of the respective panelist(s). Such computing devices are provided with an on device meter as part of a registration process by which the user(s) of the device(s) join the panel. In examples disclosed herein, the on device meters (ODM) are instrumental to periodically or aperiodically transmit cached internet content for the cache of the corresponding computing device to a monitoring data collection site. In examples disclosed herein, the monitoring data collection site analyzes the receive cache and stores the received website contents. In examples disclosed herein, the websites in the received cache may, then, not need to be visited by the web crawler. As a result, the amount of website visits that the web crawler makes are reduced without reducing the accuracy of its internet indexing efforts.

In examples disclosed herein, the monitoring data collection site receives cache content information, browser information and location information from panelists. That is, the monitoring data collection site receives information about the website(s) in the cache, the type of browser a panelist was using when retrieving the website(s), and where a panelist's computer was physically located (e.g., in Chicago, Ill., Boulder, Colo., etc.) when they visited the cached websites. In examples disclosed herein, the web crawler may visit websites viewed by panelist(s) from other locations or with other browsers than the panelist(s) but will not visit the websites viewed by the panelist from the same location and with the same browser and/or language settings as the panelist. This reduces the number of website visits that the web crawler makes without reducing the accuracy and/or completeness of its internet indexing.

FIG. 1 is a block diagram of an example indexing system constructed in accordance with the teachings of this disclosure. The example indexing system of FIG. 1 includes a monitoring data collection site 105 and an on-device meter (ODM) 132 operating on a mobile device 130.

The monitoring data collection site 105 of the illustrated example collects website data from the cache of mobile devices such as the example mobile device 130. The example monitoring data collection site 105 includes a web crawler 115 that visits and/or retrieves websites and/or other content hosted by web servers such as web server 120. As used herein, "content" includes advertisements as well as other types of material (e.g., entertainment, news, media, weather, message etc.). An example implementation of the monitoring data collection site 105 of FIG. 1 is discussed in further detail in connection with FIG. 2.

The web server 120 of the illustrated example is any server that hosts internet content (e.g., one or more websites, advertisements, etc.). The web server 120 may be implemented by any type of server that provides any type of content to any type of entity that requests the same (e.g., the mobile device 130 and/or the web crawler 115) via the internet.

The mobile device 130 of the illustrated example is any computing device that requests and/or receives content from websites hosted by any web server (e.g., web server 120) via the internet. The example mobile device 130 of the illustrated example communicates with and transfers data to the example monitoring data collection site 105. The example mobile device 130 of the illustrated example is owned, leased and/or operated by a panelist. As used herein, a panelist is a person who agrees to have their internet activity monitored. The panelist typically provides his/her demographic information (e.g., age, gender, race, residence, etc.) to a monitoring entity (or other entity building a panel of panelists). The panelist is then assigned a panelist identifier. In some examples, the ODM 132 is downloaded or otherwise provided to the panelist's mobile device 132 in connection with the registration process.

In the illustrated example, the mobile device 130 is a smartphone or tablet that has a handheld size and/or form factor such that the panelist can easily move (e.g., carry) the mobile device 130 to different locations. Alternatively, the mobile device 130 may be a laptop computer or any other type of portable computing device able to request and/or receive websites hosted by the web server 120. Although this disclosure focuses on mobile devices, the techniques of this disclosure are also applicable to stationary devices such as smart tables, desktop computers, etc. As used herein, the term "internet access device" refers generally to mobile devices and stationary devices. Thus, all examples discussed herein in terms of mobile devices could likewise be applied to stationary devices that access the internet. The mobile device 130 of the illustrated example includes the on-device meter 132. Example implementations of the mobile device 130 and the on-device meter 132 are discussed below in connection with FIG. 3.

In the illustrated example, the mobile device 130 and the monitoring data collection site 105 are able to communicate with the web server 120 and vice versa via a network 125. The example network 125 of FIG. 1 allows a communication to occur between any two of (1) the example mobile device 130, the example monitoring data collection site 105 and/or (3) the example web server 120. Thus, the example network 125 of FIG. 1 also allows communication to occur between the example mobile device 130 and the example monitoring data collection site 105. The example network 125 may be implemented using any type of public or private network such as, for example, the Internet, a telephone network, a local area network (LAN), a cable network, and/or a wireless network. To enable communication via the example network 125, each of the example mobile device 130, the example monitoring data collection site 105 and/or the web server 120 of FIG. 1 of the illustrated example includes a communication interface that enables connection to an Ethernet, a digital subscriber line (DSL), a telephone line, a coaxial cable and/or a wireless connection, etc.

Figure 2:
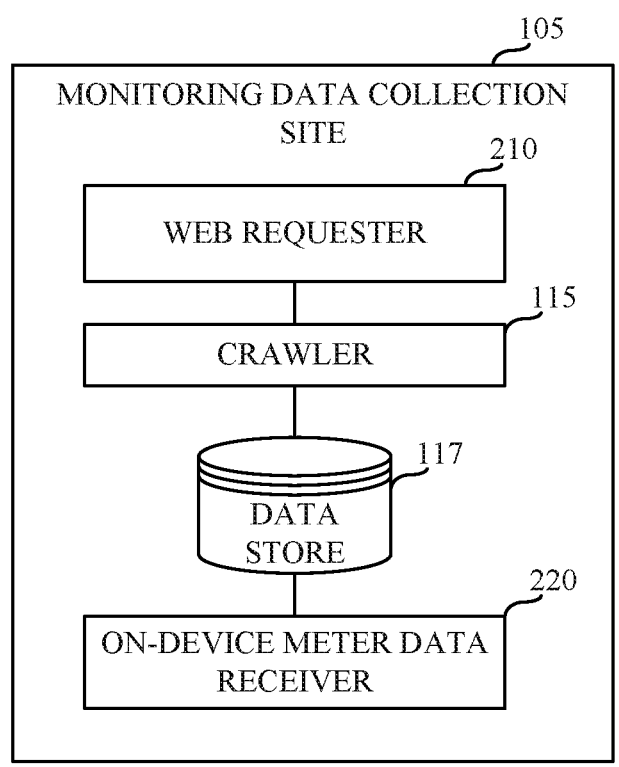
FIG. 2 is a block diagram of an example implementation of the example monitoring data collection site 105 of FIG. 1.

FIG. 2 is a block diagram of an example implementation of the monitoring data collection site 105 of FIG. 1. The example monitoring data collection site 105 includes a web requester 210, a crawler 115, a data store 117 and an on-device meter data receiver 220.

The web requester 210 of the illustrated examples visits websites (e.g., websites hosted by the web server 120) via the network 125 when instructed to do so by the crawler 115. The example web requester 210 may be implemented as a browser or other software application capable of visiting websites. When the example web requester 210 of the illustrated example visits a website, it requests the website from the web server 120 (e.g., via an HTTP request over network 125). The example web server 120 then sends the data representing the website (e.g., HTML representing content, advertisements, etc.) to the example web requester 210 via the network 125. After receiving the data/website, the example web requester 210 stores the received data/website or a portion thereof (e.g., certain content and/or advertisement(s) from the website specified by the example crawler 115) in the example data store 117. In some examples, the webpage is rendered by executing the HTML in a browser and an image of the rendered webpage is stored.

The crawler 115 of the illustrated example is a web crawler. The example web crawler 115 of FIG. 2 instructs the web requester to request websites (e.g., from the web server 120). In the illustrated example, the crawler 115 maintains a list of websites that are to be visited by the web requester 210. In other examples, the websites to be visited by the crawler 115 are generated by an algorithm (e.g., based on links found in previously visited websites). In the illustrated example, the crawler 115 periodically and/or aperiodically updates the list of websites to be visited (e.g., every day, every hour, every minute, in response to an event, etc.). The example crawler 115 of FIG. 2 may be updated based on input from a user, information from previously visited websites, or other factors.

In addition to maintaining or otherwise constructing, a list of websites to be visited, the example crawler 115 of FIG. 2 also maintains a list of geographic locations from which to access the websites (e.g., cities, states, or other geographic locations). In the illustrated example, the crawler 115 and web requester 210 are located at a fixed geographic location. Therefore, the web requester 210 does not actually request web pages from different physical locations but instead "spoofs" its physical location by representing itself as located at the desired physical location. In the illustrated example, this location spoofing is performed by changing the web requester's user agent setting or other identifying information such that the web requester 210 exhibits a virtual location when requesting the website from the example web server 120. Therefore, when the web requester 210 requests a website, the user-agent field of the HTTP request indicates the web requester 210 is located at a different location than where it is actually physically located. As a result, the web server 210 considers the request to originate at the virtual location and, thus, returns the requested website as if the web requester 210 were physically in the virtual location identified by the user agent field. Consequently, the example web requester 210 is able to retrieve multiple versions of the website hosted by the example web server 120 (e.g., a web server may provide different (e.g., local) content and/or advertisements in the website presented to internet users depending on where the users are believed to be located).

In addition to maintaining or otherwise constructing, a list of websites to be visited, the example crawler 115 also maintains a list of browser types to employ for visits the websites. Web servers sometimes provide a different website to an internet user based on the type of browser they are using to view the website. In the illustrated example, the crawler 115 achieves this browser diversity by instructing the web requester 210 to visit a website using different browsers to target the same webpage (e.g., requesting webpage 1 with Mozilla Firefox via a first request, requesting webpage 1 with Microsoft Internet Explorer via a second request and also requesting the same webpage 1 with Google Chrome via a third request).

In addition to maintaining or otherwise constructing a list of websites to be visited, the example crawler 115 also maintains a list of different language settings to use when visiting the websites. Web servers sometimes provide a different website to an internet user based on the language setting of the browser they are using to view the website (e.g., content provided in various languages). In the illustrated example, the crawler 115 instructs the web requester 210 to visit a website using different language settings to target the same webpage (e.g., requesting webpage 1 with Mozilla Firefox with the language setting set to English, requesting webpage 1 with Mozilla Firefox with the language setting set to French, etc.).

The example crawler 115 of the illustrated example communicates with the data store 117 to determine what websites have been visited by panelists (e.g., using the mobile device 130 or a stationary device), what locations panelists have visited the websites from, what browsers panelists have visited the websites with, and what language settings panelists used when visiting the websites. The acquisition of this data is discussed below. The example crawler 115 of FIG. 2 uses this information to determine what instructions to give to the web requester 210 about which websites to visit. For example, if the example crawler 115 determines that a panelist has visited a certain website (website 1) from a certain geographic location (e.g., Chicago) using the browser type and language of interest, the crawler 115 does not instruct the web requester 210 to visit the website from that location (e.g., virtual location) with that browser type and language setting because the data store already has the data from the panelist that would otherwise be gathered by the web requester 210.

The data store 117 of the illustrated example stores websites (e.g., content, advertisements, etc.) received from the on-device meter data receiver 220. In the illustrated example, the example data store 117 stores each website along with corresponding information including the location(s) from which the website was visited (e.g., the physical location of a panelist or the virtual location of the example web requester 210), the browser(s) used to visit the website, and the language setting(s) of the browser(s) when the website was visited. An example table showing an example of storing this data is shown in FIG. 8.

The example on-device meter data receiver 220 receives data from the on-device meter(s) 132 of the mobile device(s) 130 (and/or stationary device(s)). In the illustrated example, the data received by the on-device meter data receiver 220 from the on-device meter 132 includes websites visited by the mobile device 130, the respective location(s) the websites were visited from, the respective browser(s) used to visit the websites, and the respective language settings of the browser when the websites were visited. The example on-device meter data receiver 220 stores the data it receives in the example data store 117.

While an example manner of implementing the monitoring data collection site 105 of FIG. 1 is illustrated in FIG. 2, one or more of the elements, processes and/or devices illustrated in FIG. 2 may be combined, divided, re-arranged, omitted, eliminated and/or implemented in any other way. Further, the example web requester 210, the example crawler 115, the example data store 117, the example on-device meter data receiver 220 and/or, more generally, the example monitoring data collection site 105 of FIG. 1 may be implemented by hardware, software, firmware and/or any combination of hardware, software and/or firmware. Thus, for example, any of the example web requester 210, the example crawler 115, the example data store 117, the example on-device meter data receiver 220 and/or, more generally, the example monitoring data collection site 105 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example web requester 210, the example crawler 115, the example data store 117, the example on-device meter data receiver 220 and/or, more generally, the example monitoring data collection site 105 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitoring data collection site 105 of FIG. 2 may include one or more elements, processes and/or devices in addition to, or instead of, those illustrated in FIG. 2, and/or may include more than one of any or all of the illustrated elements, processes and devices.

Figure 3:
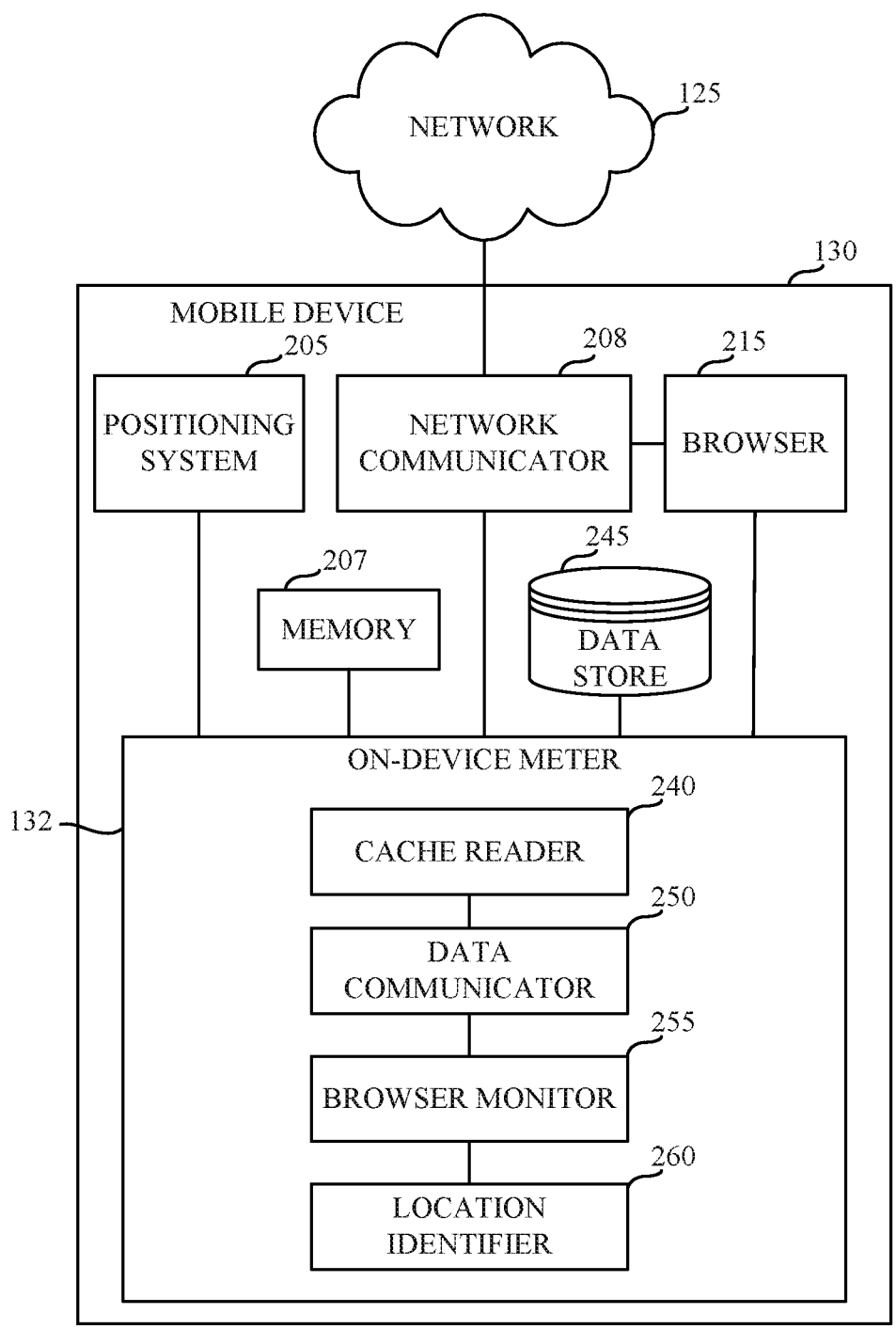
FIG. 3 is a block diagram of an example implementation of the example mobile device 130 of FIG. 1.

FIG. 3 is a block diagram of an example implementation of the example mobile device 130 of FIG. 1. The example mobile device 130 of FIG. 3 includes a position system 205, a network communicator 208, a browser 215, a memory 207, a data store 245 and an on-device meter 132.

The positioning system 205 of the illustrated example monitors the position (e.g., the physical location) of the mobile device 130. In the illustrated example, the positioning system 205 is a GPS receiver that generates a location based on signals received from the GPS satellite system. In other examples, other devices that can receive and/or detect a current location (e.g., receiving a location via the internet, using cell phone triangulation) may be used as the example location positioning system 205.

The example network communicator 208 of the illustrated example communicates with the example network 125. The example network communicator 208 sends requests, as instructed by the example browser 215, to the example web server 120 requesting websites. The example network communicator 208 receives data representative of websites (e.g., HTML, etc.) from the example web server 120. The example network communicator 208 sends cached data from the on-device meter 132 (e.g., data and/or metadata representing websites visited, locations from which websites were visited, browser type being used, language setting, etc.) to the example monitoring data collection site 105.

The browser 215 of the illustrated example is a software application that accesses media (e.g., retrieves websites and advertisements) from the internet. The example browser 215 of the illustrated example instructs the example network communicator 208 to send HTTP requests to a web server 120 to retrieve websites and/or other data (e.g., advertisements, media, etc.). The example browser 215 renders data (e.g., HTML) received by the example network communicator 208 for display on a display device of the mobile device 130. The example browser 215 of FIG. 2 stores a history of websites visited in a cache in the example memory 207. The history identifies the date and time that websites were visited. This history is often provided in commercial browsers to enable users to quickly access websites they previously found to be of interest.

The memory 207 of the illustrated example is used by the mobile device 130 for data storage. The example memory 207 stores software applications, metadata and/or data. The example memory 207 caches data representative of websites (e.g., HTML) retrieved by the mobile device 130 in order to enable display of the same without repeatedly requesting the data from the server serving the data. The example memory 207 of the illustrated example also stores the browser cache that identifies to websites (e.g., URL and data) visited by the example browser 215. The memory 207 of the illustrated example also stores geographic location(s) of the mobile device 130 when the cached websites were visited. The memory 207 of the illustrated example also stores data identifying the type of browser 215 and/or the language setting(s) of the browser 215 when corresponding websites were retrieved.

The example data store 245 offers an alternative location for storing website browsing history, geographic location and/or language settings. In the illustrated example, the memory 207 and/or the data store 245 store (e.g., cache) the websites, internet browsing history, language settings and geographic locations of the mobile device 130. In the illustrated example, data captured by the ODM 132 is stored to the data store 245.

The on-device meter (ODM) 132 of the illustrated example monitors the browsing activity of the mobile device 130. The example on-device meter 132 of FIG. 3 includes a cache reader 240, a data communicator 250, a browser monitor 255 and a location identifier 260. In some examples, in addition to supporting internet indexing as explained below, the ODM 132 is provided with functionality to monitor media exposure, detect usage, and/or other functions of the mobile device 130 and/or activities of the user(s) of the mobile device 130. Data gathered by the ODM 132 using this functionality is also stored in the data store 245.

The cache reader 240 of the illustrated example reads the browser cache of the memory 207. The example cache reader 240 reads the websites (e.g., the uniform resource locator(s) (URL) of websites, the content of websites, etc.) visited by the example browser 215 that are stored in the cache of the memory 207. This data may be accrued by reading the browser history and/or parsing the website data directly.

The data communicator 250 of the illustrated example transmits data from the on-device meter 132 to the monitoring data collection site 105 via the network 125. In some examples, the data communicator 250 exports the URLs identified in the browser history along with their respective dates of access to the monitoring data collection site 105 to enable the monitoring data collection site 105 to decide whether some or all of the content corresponding to one or more of the URLs should be uploaded.

The browser monitor 255 of the illustrated example monitors the browser 215. The example browser monitor 255 detects when the example browser 215 visits a website and generates a log identifying the URLs of such webpages, data and times of such visits, and/or identification of the user(s) of the device during the corresponding activity. The log generated by the example browser monitor 255 is different from the browser history and/or the cached website content. The browser history is typically generated by the browser 215 as part of the browser's native functionality. In contrast, the log is generated by the browser monitor 245 to support audience measurement and/or internet indexing. In the illustrated example, the log duplicates much of the data in the cache and in the browser history. This approach enables longer storage of the website than might be present via the cache. For example, the cache may be flushed by operation(s) of the mobile device 130 thereby rendering retrieval of the websites impossible.

The location identifier 260 of the illustrated example identifies the physical location of the mobile device 130 by accessing the positioning system 205. This location data may be logged in the log by the browser monitor 255.

While an example manner of implementing the mobile device 130 of FIG. 1 is illustrated in FIG. 3, one or more of the elements, processes and/or devices illustrated in FIG. 3 may be combined, divided, re-arranged, omitted, eliminated and/or implemented in any other way. Further, the example positioning system 205, the example network communicator 208, the example browser 215, the example memory 207, the example data store 245, the example on-device meter 132, the example cache reader 240, the example data communicator 250, the example browser monitor 255, the example location identifier 260, and/or, more generally, the example mobile device 130 of FIG. 3 may be implemented by hardware, software, firmware and/or any combination of hardware, software and/or firmware. Thus, for example, any of the example positioning system 205, the example network communicator 208, the example browser 215, the example memory 207, the example data store 245, the example on-device meter 132, the example cache reader 240, the example data communicator 250, the example browser monitor 255, the example location identifier 260, and/or, more generally, the example mobile device 130 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example positioning system 205, the example network communicator 208, the example browser 215, the example memory 207, the example data store 245, the example on-device meter 132, the example cache reader 240, the example data communicator 250, the example browser monitor 255, the example location identifier 260, and/or, more generally, the example mobile device 130 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile device 130 of FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the monitoring data collection site 105 of FIGS. 1 and 2 and/or the mobile device 130 of FIGS. 1 and 3 are shown in FIGS. 4-7. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-7, many other methods of implementing the example monitoring data collection site 105 of FIGS. 1 and 2 and/or the mobile device 130 of FIGS. 1 and 3 may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 4:
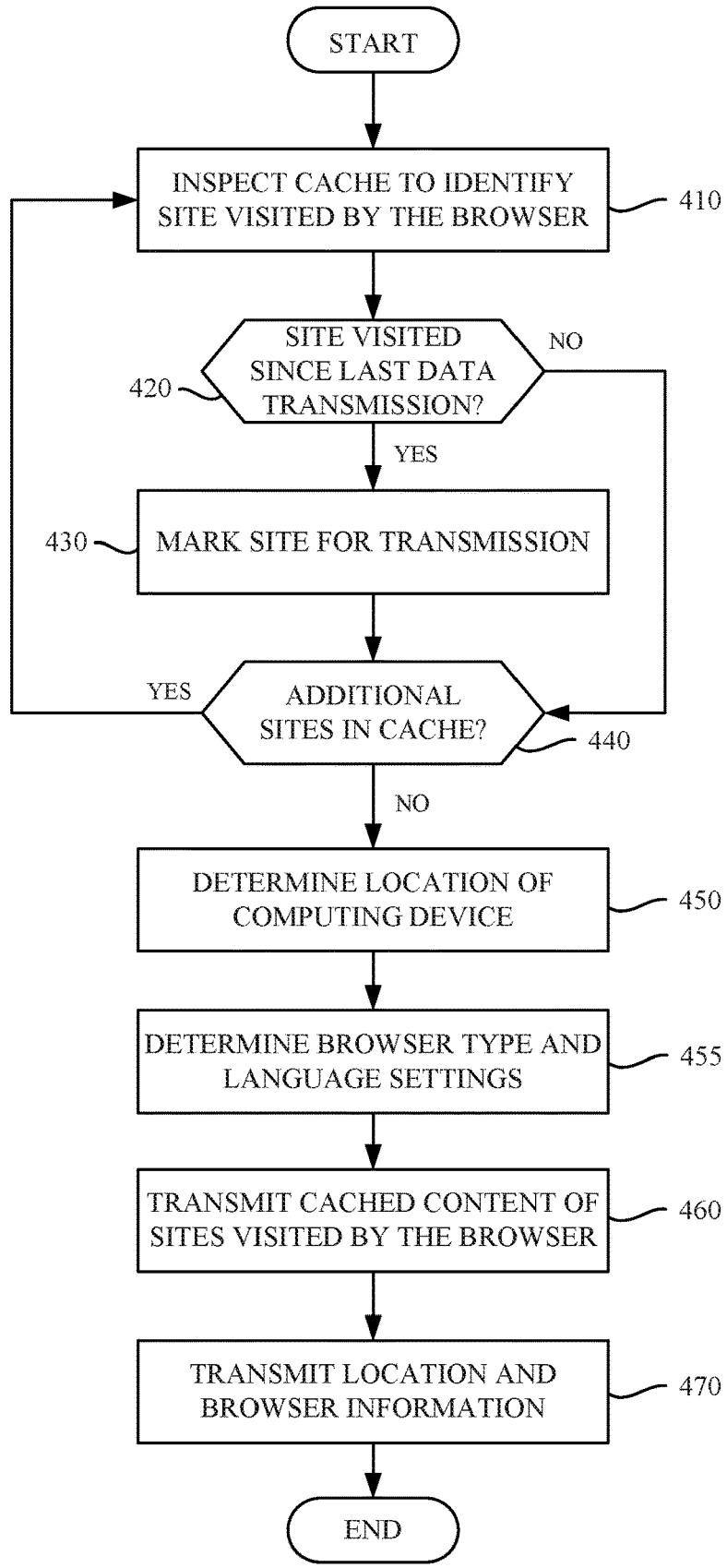
FIGS. 4, 4A and 5-6 are flowcharts representative of example machine readable instructions that may be executed to implement the example on-device meter 132 of FIGS. 1 and 3.
Figure 4A:
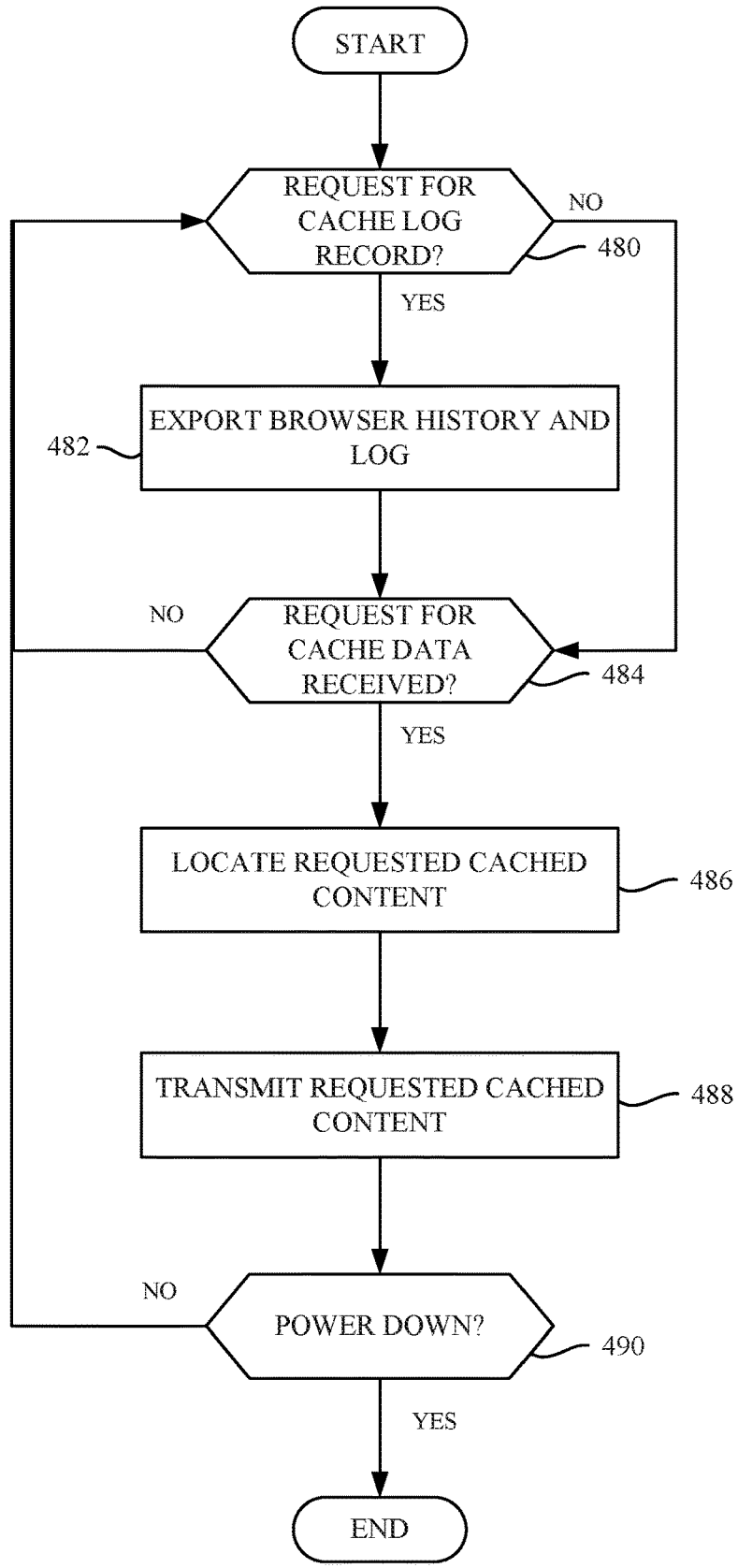

FIG. 4 is a flowchart representative of example machine readable instructions for implementing the example on-device meter 132 of FIGS. 1 and 3. In this example, the ODM 132 functions to push its cached data to the monitoring data collection facility 105. An alternative manner of implementing the ODM 132 is shown in FIG. 4A. FIG. 4 begins when the example cache reader inspects the cache of the example memory 207 and/or the data in the data store 245 to identify a website visited by the example browser 215 and the date and time that the website was visited (block 410). The cache reader 240 of the illustrated example may perform this inspection periodically (e.g., in response to a timer) or aperiodically (e.g., in response to a request from the monitoring data collection site 105). The example cache reader 240 of the illustrated example determines whether the website was visited by the example browser 215 since the last time data was transmitted from the example on-device meter 132 to the example monitoring data collection site 105 (block 420). If the example cache reader 240 determines that the website was not visited by the example browser 215 since the last data transmission from the example on-device meter 132 (block 420), control passes to block 440.

If the example cache reader 240 determines that the website was visited by the example browser 215 since the last data transmission from the example on-device meter 132 (block 420), then the cache reader 240 marks the website (e.g., sets a flag corresponding to the website in the cache) to be included in the next data transmission from the on-device meter 132 (block 430). The example cache reader 240 then determines whether there are additional websites in the cache of the example memory 207 (block 440). If there are additional websites in the cache to be investigated (block 440), control returns to block 410.

If there are not additional websites to be investigated (block 440), the example location identifier 260 determines the location(s) of the example mobile device 130 when the corresponding website(s) were accessed (block 450). In some examples, this location determination is performed by accessing the log generated by the browser monitor 255. In other examples, the current location is assumed to be the location from which website(s) were accessed and, thus, the location(s) are determined by accessing the example positioning system 205 for a current location reading (block 450).

The example browser monitor 255 then determines the browser type and language settings used when the corresponding websites were accessed (block 455). In some examples, the browser type and language settings are recorded in the log by the browser monitor 255 as usage of the mobile device 130 is monitored. Thus, in such examples, the browser type and language settings are obtained by accessing the log (block 455).

The example data communicator 250 transmits the marked cached content (e.g., the websites that were marked for transmission by the example cache reader 240) to the example monitoring data collection site 105 via the network 125 (block 460). The example data communicator 250 also transmits the browser information (e.g., the type of browser 215) and the language settings of the browser 215 used to access the websites to the example monitoring data collection site 105 via the network 125 (block 470). The example process of FIG. 4 then ends.

A flowchart representative of example machine readable instructions for implementing the on-device meter 132 of FIGS. 1 and 3 in an alternative manner is shown in FIG. 4A. In this example, the ODM 132 does not export content to monitoring data collection site 105 unless and until the monitoring data collection site 105 requests the same. Instead, the ODM 132 exports the browser history and/or log of the corresponding mobile device 130 to enable the monitoring data collection site 105 to determine which portion(s), if any, of the cached content (from the memory 207 and/or the data store 245) it wishes to receive. This approach advantageously reduces the amount of data transferred, thereby reducing the bandwidth requests of the system and the storage needs of the monitoring data collection site 105.

The process of FIG. 4A begins when the example data communicator 250 determines whether it has received a request for the cache log record (block 480). If the example data communicator 250 has not received a request for the cache log record (block 480), control passes to block 484. If the example data communicator 250 has received a request for the cache log record (block 480), the example cache reader 240 exports the browser history and log (block 482).

After the example cache reader 240 exports the browser history and log (block 482) or after the example data communicator 250 determines that it did not receive a request for the cache log record (block 480), the data communicator 250 determines whether it has received a request for cached data (block 484). If the example data communicator 250 has not received a request for cached data (block 484), control returns to block 480. If the example data communicator 250 has received a request for cached data (block 484), the example cache reader 240 locates the requested cached content (e.g., by accessing the example memory 207 and/or the example data store 245).

After the example cache reader locates the requested cached content (block 486), the example data communicator 250 transmits the requested cached content to the monitoring data collection site 105 via the network 125 (block 288). The example on-device meter 132 determines whether to power down (block 490). If the example on-device meter 132 determines that it is not time to power down (block 490), control returns to block 480. If the example on-device meter 132 determines that it is time to power down, the example of FIG. 4A ends.

As noted above, the ODM 132 of the illustrated example is provided to monitor usage, media exposure or other functionality of the mobile device 130. The specifics of that functionality is immaterial to this disclosure and is, thus, omitted from FIGS. 4 and 4A.

Figure 5:
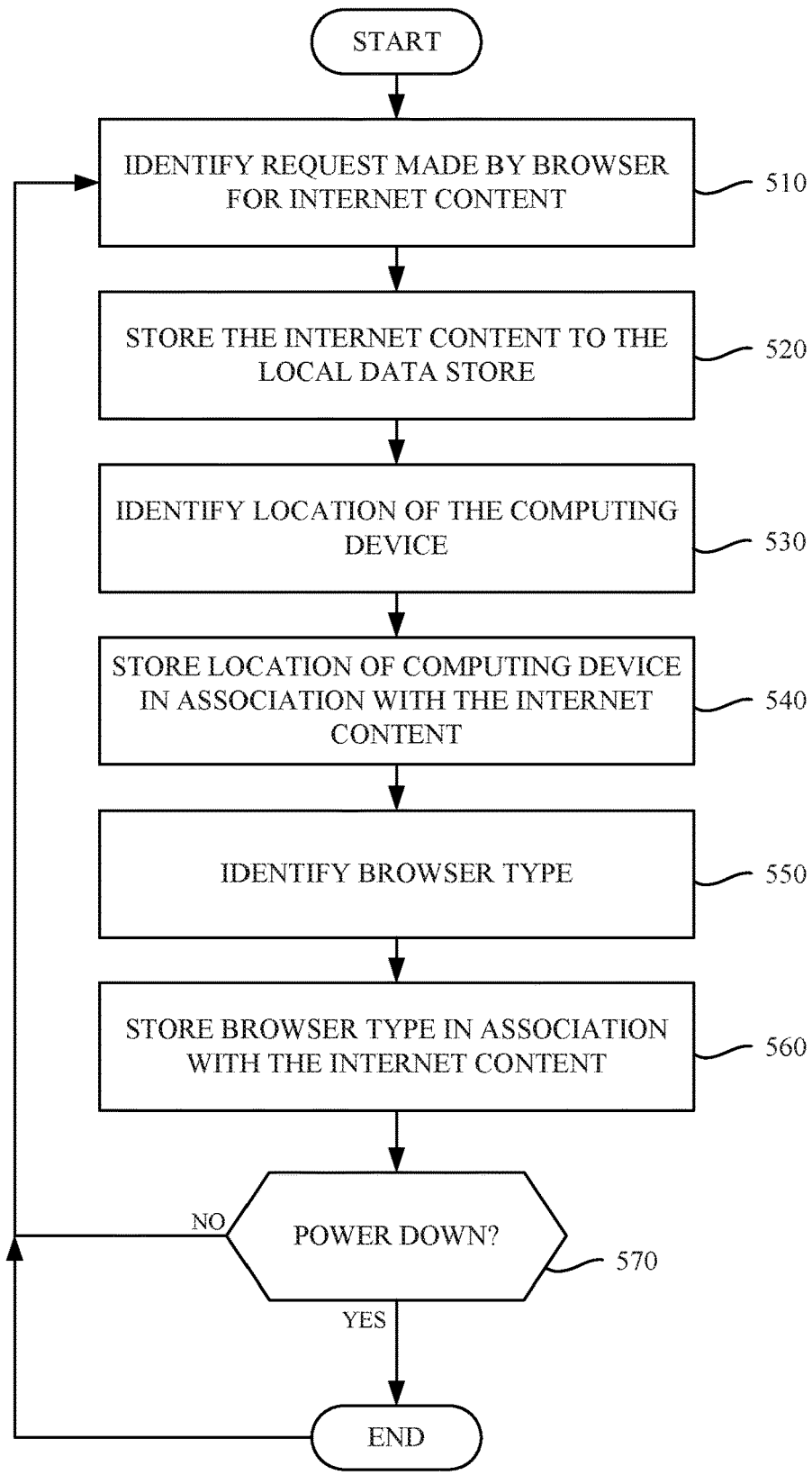

FIG. 5 is a flowchart representative of example machine readable instructions for implementing the example on-device meter 132 of FIGS. 1 and 3 to collect and store data. FIG. 5 begins when the example browser monitor 255 detects a request (e.g., an HTTP request) made by the example browser 215 for internet content (e.g., a website from the example web server 120) (block 510). When the internet content (e.g., the website from the example web server 120) is received by the example browser 215, the example browser monitor 255 stores the received internet content in the example data store 245 (block 520).

The example location identifier 260 determines the location of the example mobile device 130 by accessing the example positioning system 205 (530). The example location identifier 260 then stores the determined location in association with the stored internet content in the log in the example data store 245 (block 540). The example browser monitor 255 determines the browser type (e.g., the type of browser 215) and the language settings of the browser 215 by accessing the example browser 215 (block 550). The example browser monitor 255 then stores the determined browser type in association with the stored internet content in the log in the example data store 245 (block 560).

The example ODM 132 determines whether it is time to power down (e.g., based on whether the example mobile device 130 is powered down) (block 570). If the example ODM 132 determines that it is not time to power down (block 570), control returns to block 510. If the example ODM 132 determines that it is time to power down (block 570), then the example process of FIG. 5 then ends.

Figure 6:
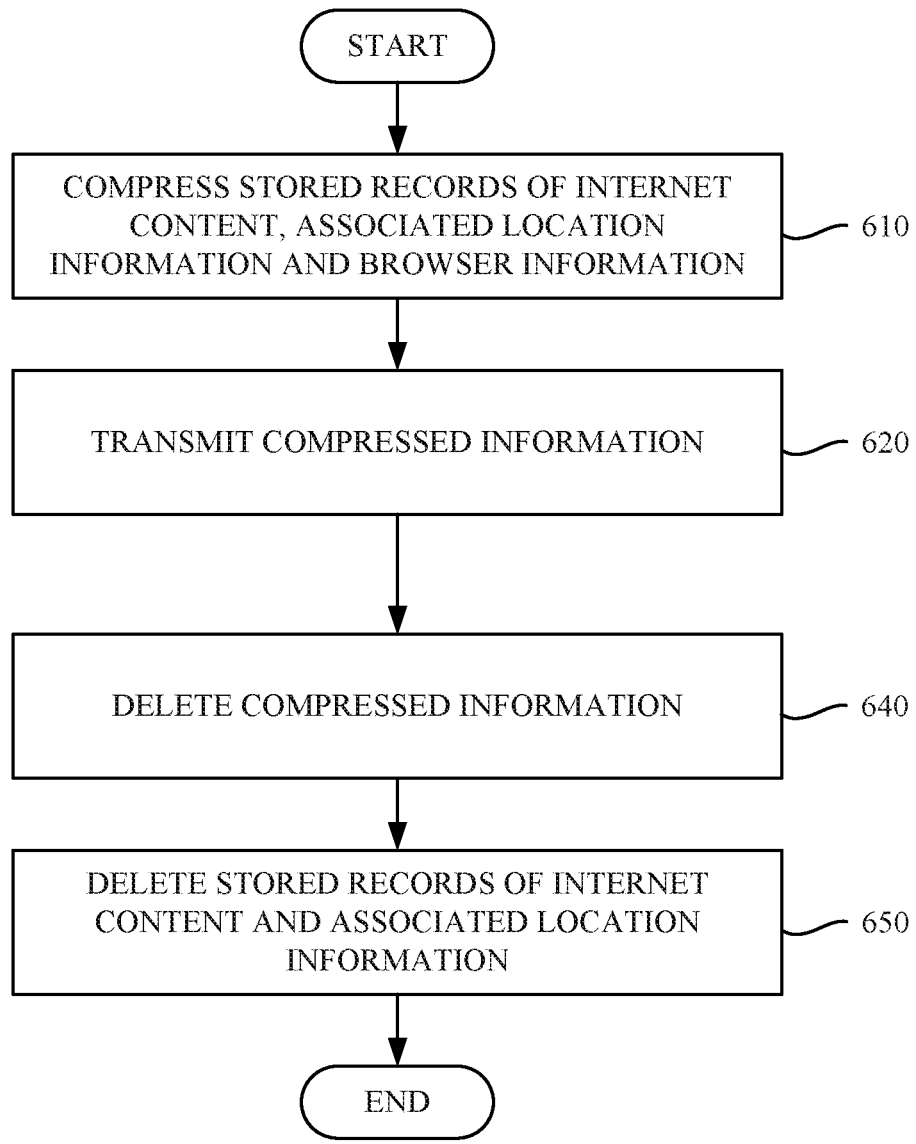

FIG. 6 is a flowchart representative of example machine readable instructions for implementing blocks 460 and 470 of FIG. 4 and/or block 488 of FIG. 4A using data compression. The example of FIG. 6 begins when the example data communicator 250 compresses the stored records (e.g., contents of received websites), associated location information (e.g., locations determined by the example location identifier 260), and the associated browser information (e.g., the type of the example browser 215 and the language settings of the browser 215) (block 610). The example data communicator 250 then transmits the compressed information to the example monitoring data collection site 105 via the network 125 (block 620). The example data communicator then deletes the compressed information (block 640). In some examples, the example data communicator 250 only deletes the records of internet content and associated location information stored in the example data store 245 so as to not interfere with the user experienced offered by the mobile device 130 by permanently deleting content from the cache (block 650). In other examples, block 650 is omitted. The example process of FIG. 6 then ends.

FIGS. 7A-7D together are a flowchart representative of example machine readable instructions for implementing the example monitoring data collection site 105 of FIGS. 1 and 2. The example of FIGS. 7A-7D is particularly adapted for usage with mobile devices as implemented by the instructions of FIG. 4A. To operate with mobile device implemented in accordance with FIG. 4, the instructions of FIGS. 7A-7D are modified to receive the cached content at block 706 (instead of just the logs). The following instructions thus operate directly on the content. Blocks 736-740 are then omitted.

Figure 7A:
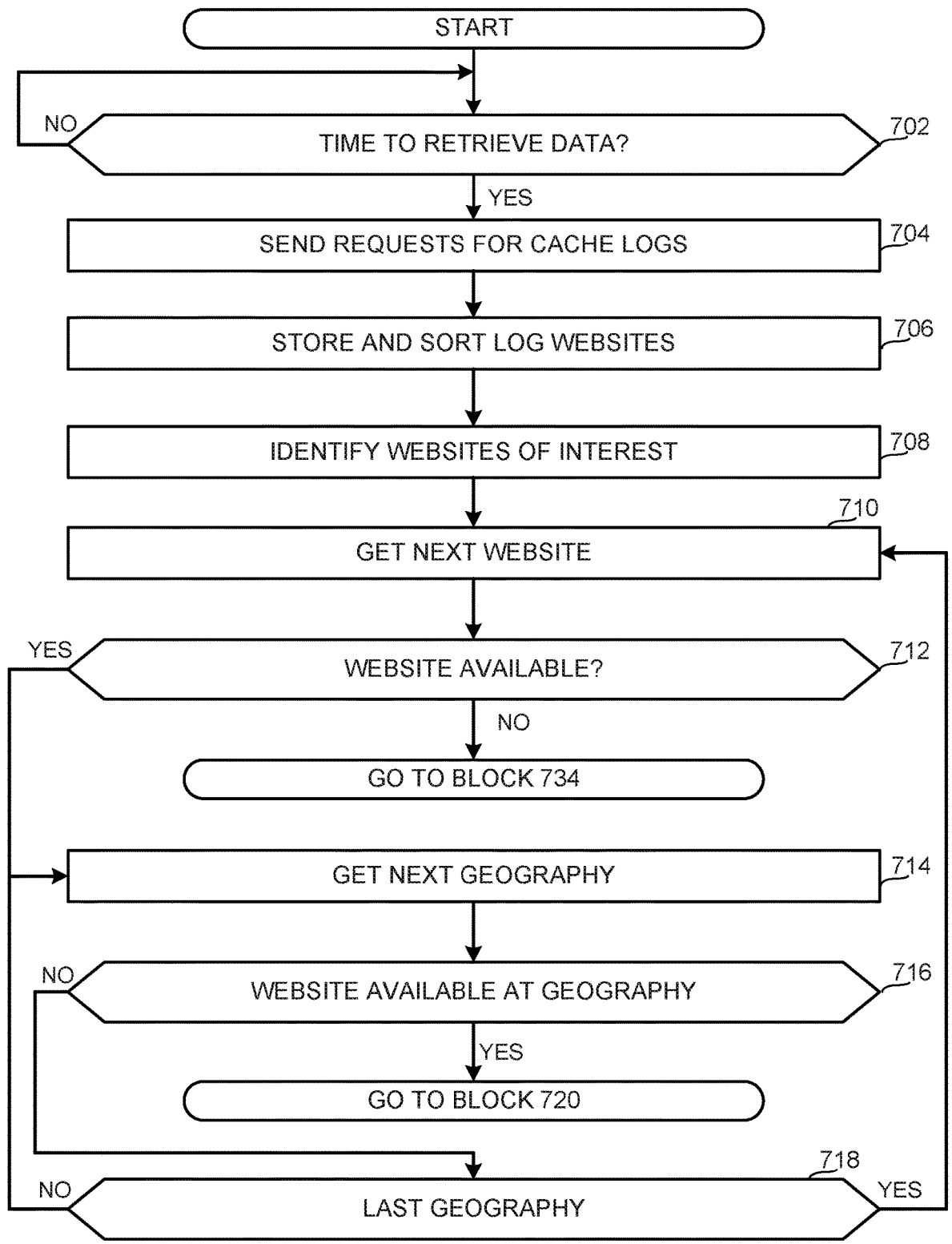
FIGS. 7A-7D are flowcharts representative of example machine readable instructions that may be executed to implement the example monitoring data collection site 105 of FIGS. 1 and 2.

Turning to FIG. 7A, the example monitoring data collection site 105 determines whether it is time to retrieve data from the mobile device 130 (e.g., based on a time elapsed since data was last received) (block 702). The example crawler 115 sends request(s) to the example ODM 132 or other ODMs of other computing devices for cache logs (block 704). The example on-device meter data receiver 220 receives logs of websites from the ODMs and stores and sorts the identifiers (e.g., the URLs) of the websites visited by the ODMs in the example data store 117 (block 706). The example crawler 115 identifies websites of interest (e.g., websites to be indexed by the crawler 115) (block 708).

The example crawler 115 selects the next website of interest to be indexed (block 710). The example crawler 115 determines if the selected website is among the list of websites received in the cache logs (i.e., the websites identified as present in the cache and log data stored on or more of the mobile devices 130) (block 712). If the selected website is not available among the list of websites received from the mobile devices (block 712), control passes to block 734 of FIG. 7B.

If the selected website is available among the list of websites received in the cache logs (block 712), the example crawler selects the next geographic location to be analyzed (block 714). The example crawler 115 then determines if the selected site is available from the selected geography among the list of websites received in the cache logs (block 716). If the selected website is available from the selected geography (block 716), control passes to block 720 of FIG. 7B. If the selected website is not available at the selected geography among the list of websites received in the cache logs, the example crawler 115 determines whether the selected geography is the last geography of interest for the website in question (block 718). If the example crawler 115 determines that the selected geography is not the last geography of interest (block 718), control returns to block 714 and another geographic location is selected. If the example crawler 115 determines that the selected geography is the last geography of interest (block 718), control returns to block 710 where the next website is returned.

Figure 7B:
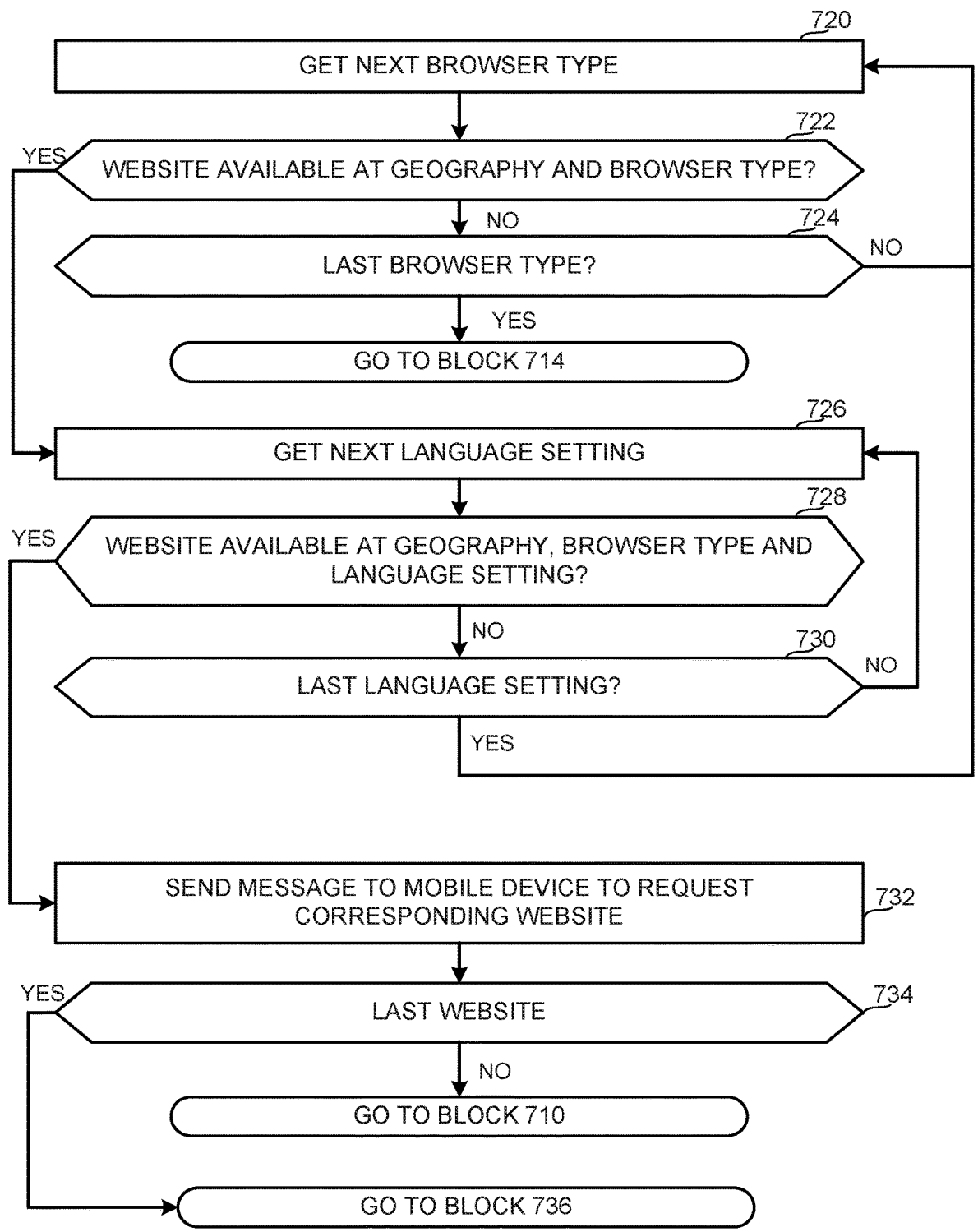
Figure 7C:
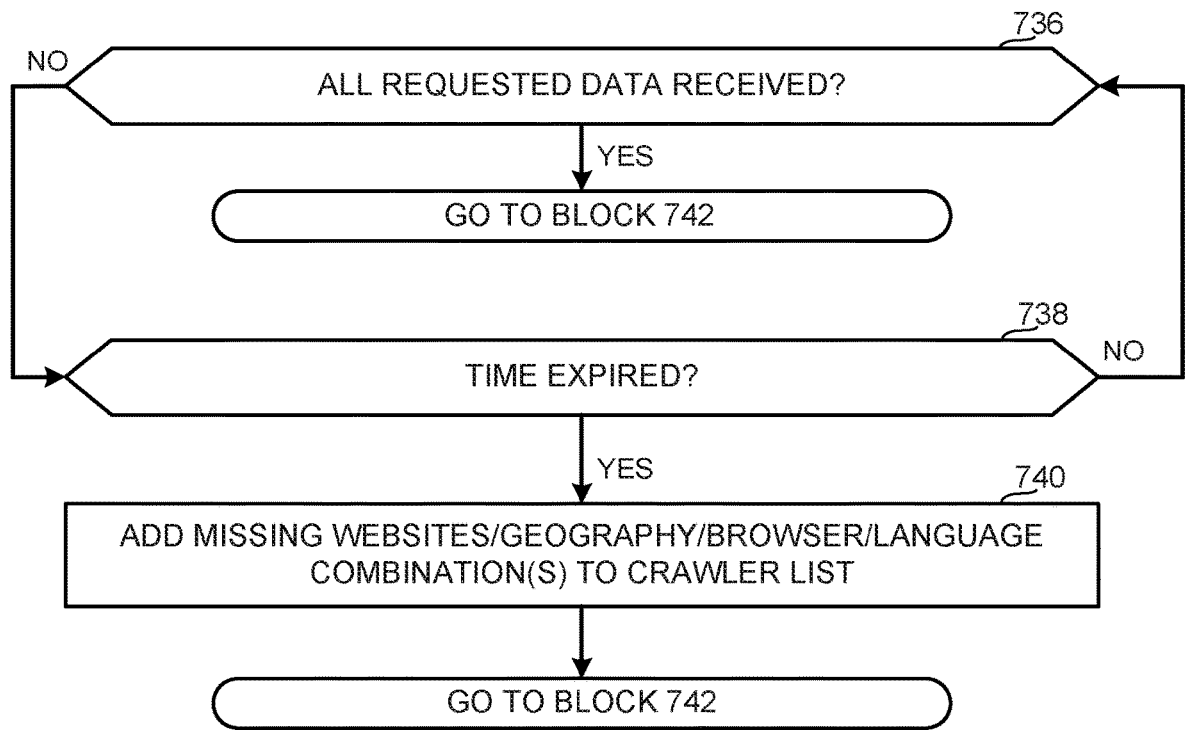
Figure 7D:
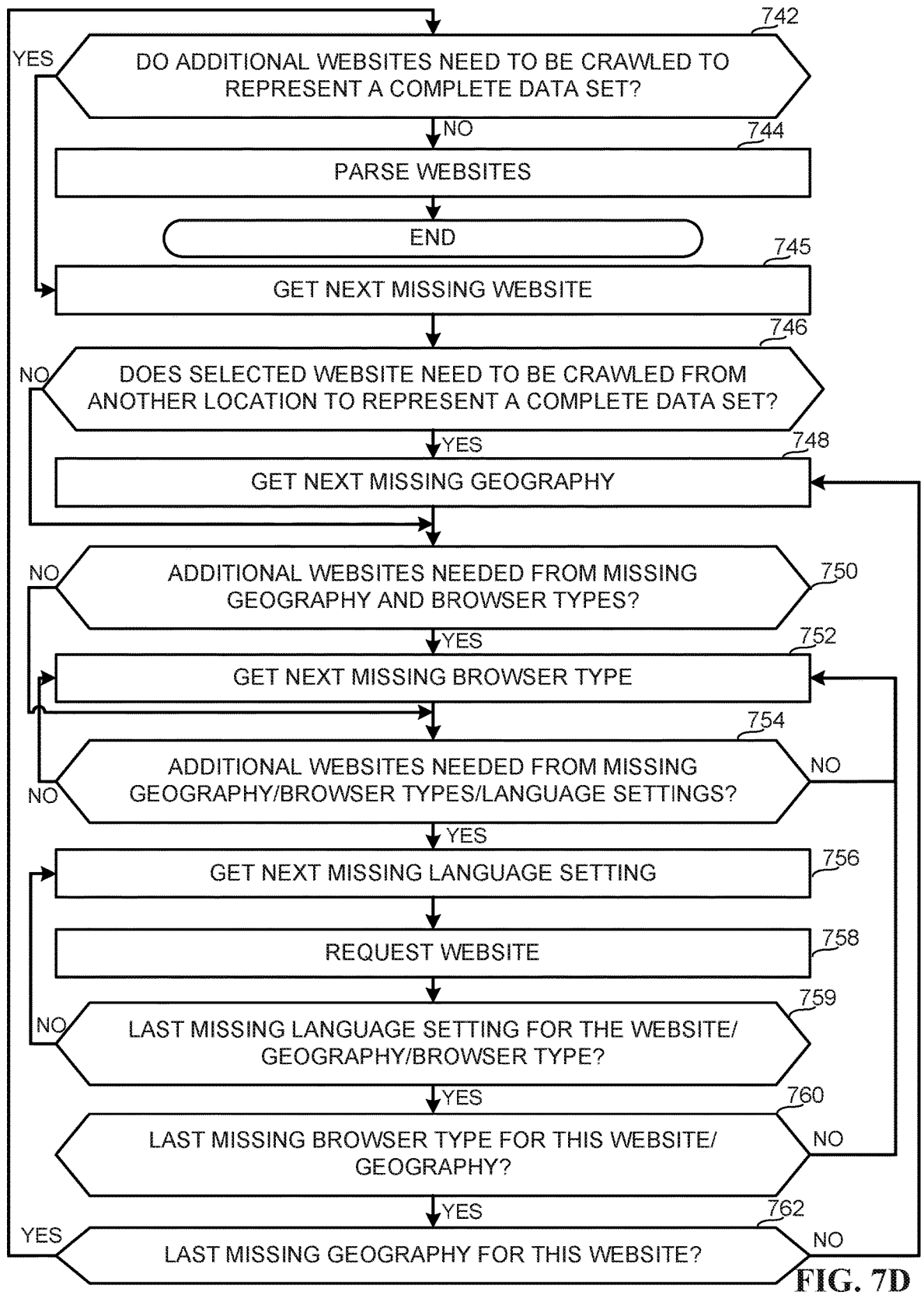

In FIG. 7B, after the example crawler 115 determines that the selected website is available at the selected geography among the list of websites received in the cache logs (block 716), the crawler 115 selects the next browser type of interest (block 720). The example crawler 115 then determines whether the selected website is available at the selected geography with the selected browser type (block 722). If the example crawler 115 determines that the selected website is available at the selected geography with the selected browser type (block 722), control passes to block 726. If the example crawler 115 determines that the selected website is not available at the selected geography with the selected browser type (block 722), the crawler 115 determines whether the selected browser type is the last browser type to be selected (block 724). If the example crawler 115 determines that the selected browser type is not the last browser type to be selected (block 724), control returns to block 720. If the example crawler 115 determines that the selected browser type is the last browser type to be selected (block 724), then control returns to block 714 of FIG. 7A and the next geographic location is selected.

After the example crawler 115 determines that the selected website is available at the selected geography with the selected browser type (block 722), the crawler selects the next language setting of interest (block 726). The example crawler 115 determines whether the selected website is available at the selected geography with the selected browser type and the selected language setting (block 728). If the example crawler 115 determines that the selected website is available at the selected geography with the selected browser type and the selected language setting (block 728), control passes to block 732. If the example crawler 115 determines that the selected website is not available at the selected geography with the selected browser type and the selected language setting (block 728), the crawler 115 determines if the selected language setting is the last language setting to be selected (block 730). If the example crawler 115 determines that the selected language setting is not the last language setting to be selected (block 730), control returns to block 726 and the next language setting is selected. If the example crawler 115 determines that the selected language setting is the last language setting to be selected (block 730), control returns to block 720 and the next browser type is selected.

If the example crawler 115 determines that the selected website is available with the selected geography, the selected browser type and the selected language setting (block 728), the example on-device meter data receiver 220 sends a request to the ODM 132 associated with the selected website from the selected geography with the selected browser type and the selected language setting requesting upload of the same from the cache memory and/or the data store 245 (block 732). The example crawler 115 determines whether the selected website is the last website to be investigated (block 734). If the example crawler 115 determines that the selected website is not the last website to be investigated (block 734), control returns to block 710 of FIG. 7A and the next website to be crawled is selected. If the example crawler 115 determines that the selected website is the last website to be investigated from the log (block 734), control passes to block 736 of FIG. 7C.

After the example crawler 115 determines that the selected website is the last website to be examined in the log (block 734), the crawler 115 determines whether all requested data has been received (e.g., all website to be crawled) (block 736). If the example crawler 115 determines that all requested data has been received (block 736), control passes to block 742 of FIG. 7D. If the example crawler 115 determines that all requested data has not been received (block 736), the crawler 115 determines if a timer has expired (e.g., a timer set to allow a certain amount of time to receive data from ODMs before the crawler 115 actively crawls the internet for additional data) (block 738). If the timer has not expired (block 738), control returns to block 736. If the timer has expired (block 738), the crawler 115 adds the missing combination(s) (if any) of websites, geographies, browser types and language settings to the list of websites to be crawled by the crawler 115 (block 740). Control then passes to block 742 of FIG. 7D.

After the crawler 115 adds the missing combination(s) of websites, geographies, browser types and language settings (i.e., the combination(s) requested but not received at blocks 732, 736, 738) to the list of websites to be crawled by the crawler 115 (block 740), the crawler 115 determines if one or more additional websites (e.g., website/geography/browser type/language setting combinations on the determined list) need to be crawled to represent a complete data set (block 742). If the example crawler 115 using one or more different combinations of geography, browser type and language setting determines that additional websites do not need to be crawled (i.e., the data set is complete) (block 742), the crawler 115 parses the websites (e.g., creates a table such as table 800 of FIG. 8 indicating where the various versions of the website were taken from) (block 744) and the example of FIG. 7 ends.

If the example crawler 115 determines that additional websites need to be crawled to represent a complete data set (block 742), the crawler 115 retrieves the next website to be crawled (block 745). The example crawler 115 then determines if the selected website needs to be crawled from one or more additional locations (e.g., virtual locations) to represent a complete data set (block 746). If the example crawler 115 determines that the selected website does not need to be crawled from an additional location to represent a complete data set (block 746), control passes to block 750. If the example crawler 115 determines that the selected website needs to be crawled from an additional location to represent a complete data set (block 746), the example crawler 115 selects the next missing geographic location (block 748).

After the example crawler 115 selects the next missing geographic location (block 748) or after the example crawler 115 determines that the selected website does not need to be crawled from an additional location (block 746), the crawler 115 determines if the selected website/geography needs to be retrieved using a selected browser type (block 750). If the example crawler 115 determines that the selected website/geography has been retrieved with all browser types of interest (block 750), control passes to block 754. If the example crawler 115 determines that the selected website/geography combination has not been retrieved for all browser types (block 750), the example crawler 115 selects the next missing browser type (block 752).

After the example crawler 115 selects the next missing browser type (block 752) or after the example crawler 115 determines that the selected website/geography combination has been retrieved with all browser types (block 750), the example crawler 115 determines whether the selected website/geography/browser type combination has been retrieved with all language settings (block 754). If the example crawler 115 determines that the selected website/geography/browser type combination has not been retrieved for all language settings (block 754), the crawler 115 selects the next missing language setting (block 756). Otherwise, control returns back to block 752 to retrieve the next missing browser type.

After the example crawler 115 selects the missing website/geography/browser type/language setting combination (block 756), the example web requester 210 requests the selected website from the selected location (e.g., virtual location) with the selected browser type using the selected language setting (block 758).

The example crawler 115 then determines if there is another missing language setting for the selected website/geography/browser type combination (block 759). If so, control returns to block 756. If not, the example crawler 115 determines whether the selected browser type was the last missing browser type for the selected website/geography (block 760).

If the example crawler 115 determines that the selected browser type was not the last missing browser type for the selected website/geography (block 760), control returns to block 752. If the example crawler 115 determines that the selected browser type was the last missing browser type for the selected website/geography (block 760), the crawler 115 determines if the selected geography was the last missing geography for the selected website (block 762). If the example crawler 115 determines that the selected geography was not the last missing geography for the selected website (block 762), control returns to block 748. If the example crawler 115 determines that the selected geography was the last missing geography for the selected website (block 762), control returns to block 742.

FIG. 8 illustrates an example table 800 that may be constructed by the crawler 115 of the illustrated example. The example table 800 indicates (1) websites that have been visited in column 802 (e.g., cnn.com or amazon.com in the example of FIG. 800), (2) geographic locations that the websites have been visited from in column 804 (e.g., Chicago or New York in the example of FIG. 8), (3) a browser type that was used to visit the website in column 806 (e.g., Mozilla Firefox or Internet Explorer in the example of FIG. 8), (4) the language settings of the browser when the website was visited (e.g., English or French in the example of FIG. 8), and (5) the panelist that visited the website or, if no panelist has visited the website, an indication that the crawler 115 visited the website. For example, in the example table 800, panelist 1 visited cnn.com from New York using Mozilla Firefox with English language settings. However, no panelist visited cnn.com from New York using Mozilla Firefox with French language settings. Therefore, the example web crawler 115 visited cnn.com from New York (e.g., using a virtual location) using Mozilla Firefox with French language settings.

Figure 9:
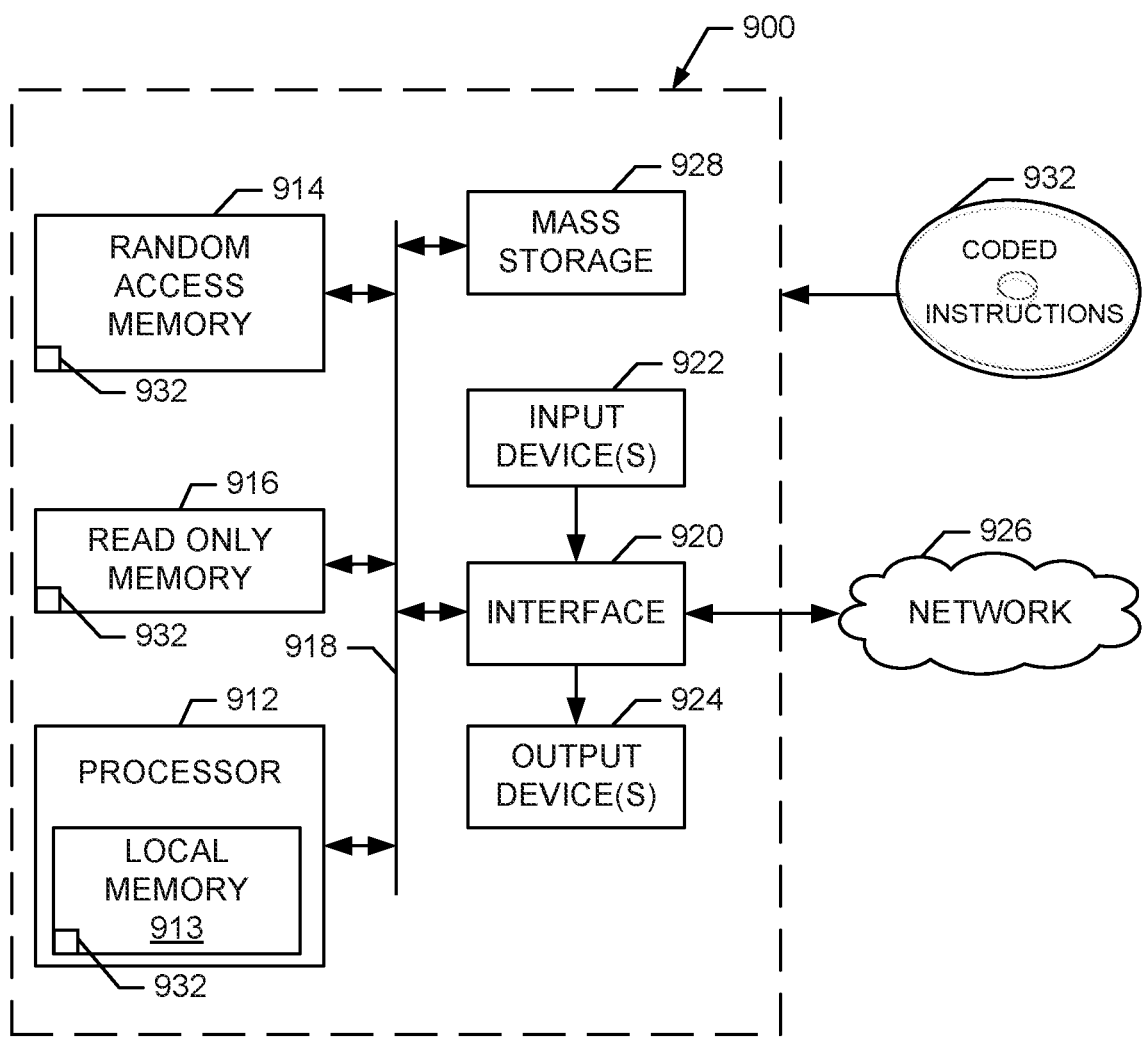
FIG. 9 is a block diagram of an example processing system capable of executing the example machine readable instructions of FIGS. 4-6 and/or 7 to implement the example on-device meter 132 of FIGS. 1 and 3 and/or the example monitoring data collection site 105 of FIGS. 1 and 2.

FIG. 9 is a block diagram of an example processor platform 900 capable of executing the instructions of FIGS. 4-6 and/or 7 to implement the monitoring data collection site 105 of FIGS. 1 and 2 and/or the example on-device meter 132 of of FIGS. 1 and 3. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 4-6 and/or 7 may be stored in the mass storage device 928, in the volatile memory 914, in the non-volatile memory 916, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a browser monitor to extract a language setting from a first web browser type of a panelist computing device; and
a data communicator to transmit data associated with a webpage accessed by the first web browser type and an indication of the language setting to an audience measurement entity server, the audience entity measurement server to generate a number of web requests for the webpage from a web server hosting the webpage, the web requests indicative of a request to retrieve the webpage, respective ones of the web requests identifying different language settings than the extracted language setting, the respective ones of the web requests identifying different web browser types than the first web browser type.

2. The apparatus of claim 1, further including a cache reader to identify the webpage by accessing a set of cached webpages cached in the panelist computing device.

3. The apparatus of claim 2, wherein the set of cached webpages is accessed from a log of webpages in the panelist computing device.

4. The apparatus of claim 1, wherein the browser monitor is to determine that the webpage has not been transmitted to the audience measurement entity server, and, in response to determining that the webpage has not been transmitted to the audience measurement entity server, the data communicator is to transmit the data associated with the webpage to the audience measurement entity server.

5. The apparatus of claim 1, wherein the audience measurement entity server is to reduce a total number of requests sent to the web server in response to obtaining the indication of the language setting from the data communicator, the audience measurement entity server to generate the number of requests based on the indication of the language setting, respective ones of the requests in the number identifying different language settings than the language setting used by the panelist computing device when the webpage was accessed.

6. The apparatus of claim 1, wherein the data communicator is to skip the first web browser type used by the panelist computing device to access the webpage, thereby reducing a total number of requests sent to the webpage by the audience measurement entity server.

7. The apparatus of claim 1, wherein the number of requests is a first number of requests, the browser monitor to identify a first physical location of the panelist computing device when the webpage was accessed, the data communicator to transmit the first physical location to the audience measurement entity server, and the audience measurement entity server to transmit a second number of requests for the webpage, respective ones of the requests in the second number identifying different physical locations than the first physical location, the requests in the second number of requests skipping the first physical location from which the webpage was requested by the panelist computing device, thereby reducing a total number of requests sent to the webpage by the audience measurement entity server.

8. The apparatus of claim 1, wherein the browser monitor is to store the data in a data store by accessing a browser history of the panelist computing device, the data including at least one of the language setting, a uniform resource locator, content of the webpage, a type of the first web browser type that accessed the webpage, a time and date when the panelist computing device accessed the webpage, or a location of the panelist computing device when the webpage was accessed.

9. The apparatus of claim 8, wherein the browser history is native to the first web browser type of the panelist computing device, and the browser monitor is to generate a log including the data in response to the first web browser type accessing the webpage, the log different from the browser history and a set of cached webpages cached in the panelist computing device.

10. A non-transitory computer readable storage medium comprising instructions that, when executed, cause at least one processor to:
extract a language setting from a first web browser type of a panelist computing device; and
transmit data associated with a webpage accessed by the first web browser type and an indication of the language setting to audience measurement entity server, the audience measurement entity server to generate a number of web requests for the webpage from a web server hosting the webpage, the web requests indicative of a request to retrieve the webpage, respective ones of the web requests identifying different language settings than the extracted language setting, the respective ones of the web requests identifying different web browser types than the first web browser type.

11. The non-transitory computer readable storage medium of claim 10, wherein the audience measurement entity server is to reduce a total number of requests sent to the web server in response to obtaining the indication of the language setting from the panelist computing device, the audience measurement entity server to generate the number of requests based on the indication of the language setting, respective ones of the requests identifying different language settings than the language setting used by the panelist computing device when the webpage was accessed.

12. The non-transitory computer readable storage medium of claim 10, wherein the number of requests is a first number of requests, and the instructions, when executed, cause the at least one processor to:
skip the first web browser type used by the panelist computing device to access the webpage, thereby reducing a total number of requests sent to the webpage by the audience measurement entity server.

13. The non-transitory computer readable storage medium of claim 10, wherein the number of requests is a first number of requests, and the instructions, when executed, cause the at least one processor to:
identify a first physical location of the panelist computing device when the webpage was accessed; and
transmit the first physical location to the audience measurement entity server, the audience measurement entity server to transmit a second number of requests for the webpage, respective ones of the requests in the second number identifying different physical locations than the first physical location, the requests in the second number of requests skipping the first physical location from which the webpage was requested by the panelist computing device, thereby reducing a total number of requests sent to the webpage by the audience measurement entity server.

14. The non-transitory computer readable storage medium of claim 13, wherein the instructions, when executed, cause the at least one processor to:
store the data in a data store by accessing a browser history of the panelist computing device, the browser history is native to the first web browser type of the panelist computing device; and
generate a log including the data in response to the first web browser type accessing the webpage, the log different from the browser history and a set of webpages cached in the panelist computing device.

15. A system comprising:
a panelist computing device to:
extract a language setting from a first web browser type; and transmit data associated with a webpage accessed by the first web browser type and an indication of the language setting to an audience measurement entity server; and the audience measurement entity server to transmit a number of web requests for the webpage from a web server hosting the webpage, the web requests indicative of a request to retrieve the webpage, respective ones of the web requests identifying different language settings than the language setting, the respective ones of the web requests identifying different web browser types than the first web browser type.

16. The system of claim 15, wherein the audience measurement entity server is to reduce a total number of requests sent to the web server by generating the number of requests to skip the language setting used by the panelist computing device when the webpage was accessed.

17. The system of claim 15, wherein the panelist computing device is to skip the first web browser type used to access the webpage, thereby reducing a total number of requests sent to the webpage by the audience measurement entity server.

18. The system of claim 15, wherein the number of requests is a first number of requests, and the panelist computing device is to identify a first physical location of the panelist computing device when the webpage was accessed and transmit the first physical location to the audience measurement entity server, and the audience measurement entity server is to transmit a second number of requests for the webpage, respective ones of the requests in the second number identifying different physical locations than the first physical location, the requests in the second number of requests skipping the first physical location from which the webpage was requested by the panelist computing device, thereby reducing a total number of requests sent to the webpage by the audience measurement entity server.

19. The system of claim 15, wherein the panelist computing device is to store the data in a data store by accessing a browser history of the panelist computing device, the data including at least one of the language setting, a uniform resource locator, content of the webpage, a type of the first web browser type that accessed the webpage, a time and date when the panelist computing device accessed the webpage, or a location of the panelist computing device when the webpage was accessed.

20. The system of claim 19, wherein the browser history is native to the first web browser type of the panelist computing device, and the panelist computing device is to generate a log including the data in response to the first web browser type accessing the webpage, the log different from the browser history and a set of webpages cached in the panelist computing device.

21. An apparatus comprising:
memory;
instructions in the apparatus; and
processor circuitry to execute the instructions to:
extract a language setting from a first web browser type of a panelist computing device; and transmit data associated with a webpage accessed by the first web browser type and an indication of the language setting to audience measurement entity server, the audience measurement entity server to generate a number of web requests for the webpage from a web server hosting the webpage, the web requests indicative of a request to retrieve the webpage, respective ones of the web requests identifying different language settings than the extracted language setting, the respective ones of the web requests identifying different web browser types than the first web browser type.

22. The apparatus of claim 21, wherein the audience measurement entity server is to reduce a total number of requests sent to the web server in response to obtaining the indication of the language setting from the panelist computing device, the audience measurement entity server to generate the number of requests based on the indication of the language setting, respective ones of the requests identifying different language settings than the language setting used by the panelist computing device when the webpage was accessed.

23. The apparatus of claim 21, wherein the number of requests is a first number of requests, and the instructions, when executed, cause the processor circuitry to:
skip the first web browser type used by the panelist computing device to access the webpage, thereby reducing a total number of requests sent to the webpage by the audience measurement entity server.

24. The apparatus of claim 21, wherein the number of requests is a first number of requests, and the instructions, when executed, cause the processor circuitry to:
identify a first physical location of the panelist computing device when the webpage was accessed; and
transmit the first physical location to the audience measurement entity server, the audience measurement entity server to transmit a second number of requests for the webpage, respective ones of the requests in the second number identifying different physical locations than the first physical location, the requests in the second number of requests skipping the first physical location from which the webpage was requested by the panelist computing device, thereby reducing a total number of requests sent to the webpage by the audience measurement entity server.

25. The apparatus of claim 24, wherein the instructions, when executed, cause the processor circuitry to:
store the data in a data store by accessing a browser history of the panelist computing device, the browser history is native to the first web browser type of the panelist computing device; and
generate a log including the data in response to the first web browser type accessing the webpage, the log different from the browser history and a set of webpages cached in the panelist computing device.

* * * * *